US012387695B2

(12) United States Patent
Hu

(10) Patent No.: US 12,387,695 B2
(45) Date of Patent: Aug. 12, 2025

(54) DISPLAY PANEL AND ELECTRONIC DEVICE

(71) Applicant: SHENZHEN CHINA STAR OPTOELECTRONICS SEMICONDUCTOR DISPLAY TECHNOLOGY CO., LTD., Guangdong (CN)

(72) Inventor: Chonglin Hu, Guangdong (CN)

(73) Assignee: Shenzhen China Star Optoelectronics Semiconductor Ltd., Shenzhen (CN)

( * ) Notice: Subject to any disclaimer, the term of this patent is extended or adjusted under 35 U.S.C. 154(b) by 0 days.

(21) Appl. No.: 17/600,444

(22) PCT Filed: Sep. 6, 2021

(86) PCT No.: PCT/CN2021/116583
§ 371 (c)(1),
(2) Date: May 27, 2024

(87) PCT Pub. No.: WO2023/029020
PCT Pub. Date: Mar. 9, 2023

(65) Prior Publication Data

US 2024/0331655 A1 Oct. 3, 2024

(30) Foreign Application Priority Data

Aug. 30, 2021 (CN) ........................ 202111004841.6

(51) Int. Cl.
*G09G 3/36* (2006.01)

(52) U.S. Cl.
CPC ......... *G09G 3/3696* (2013.01); *G09G 3/3607* (2013.01); *G09G 3/3614* (2013.01);
(Continued)

(58) Field of Classification Search
CPC ....... G09G 3/3648; G09G 3/3614; G09G 3/36
See application file for complete search history.

(56) References Cited

U.S. PATENT DOCUMENTS 5,798,740 A 8/1998 Bitzakidis et al.
7,477,223 B2 1/2009 Sekiguchi et al.
(Continued)

FOREIGN PATENT DOCUMENTS

CN 111341258 6/2016
CN 107464540 12/2017
(Continued)

OTHER PUBLICATIONS

CN113178157A Display device with variable refresh frequency, display method thereof and clock control board Apr. 8, 2021 Zhang Weiwei; Jin Yikun; Chen Yongquan (Year: 2021).*
(Continued)

*Primary Examiner* — Van N Chow

(57) ABSTRACT

A display panel and an electronic device are provided by the present application. In the image display period of at least one frames under the first preset refresh mode, during the display period, the data line is configured to output display voltage to the pixel unit, during the vertical blanking stage, the data line is configured to output compensation voltage to the pixel unit. When the display voltage is a positive polarity voltage, a voltage value of the display voltage is less than a voltage value of the compensation voltage, when the display voltage is a negative polarity voltage, the voltage value of the display voltage is greater than the voltage value of the compensation voltage.

20 Claims, 7 Drawing Sheets

(52) U.S. Cl.
CPC ..... *G09G 3/3648* (2013.01); *G09G 2310/061* (2013.01); *G09G 2320/0247* (2013.01); *G09G 2320/045* (2013.01); *G09G 2340/0435* (2013.01)

(56) References Cited

U.S. PATENT DOCUMENTS

| | | | | |
|---|---|---|---|---|
| 10,535,287 | B2 * | 1/2020 | Wang | G09G 3/20 |
| 10,777,140 | B2 | 9/2020 | Kim et al. | |
| 2003/0112213 | A1 * | 6/2003 | Noguchi | G09G 3/3614 345/96 |
| 2013/0106824 | A1 * | 5/2013 | Yamauchi | G09G 5/00 345/92 |
| 2015/0138249 | A1 | 5/2015 | Miyata et al. | |
| 2018/0074569 | A1 | 3/2018 | An et al. | |
| 2019/0335553 | A1 * | 10/2019 | Ahmed | G09G 3/32 |
| 2023/0267865 | A1 * | 8/2023 | Ying | G09G 3/20 345/212 |
| 2024/0363084 | A1 * | 10/2024 | Tian | G09G 3/3648 |

FOREIGN PATENT DOCUMENTS

| | | |
|---|---|---|
| CN | 107871474 | 4/2018 |
| CN | 110164350 | 4/2019 |
| CN | 110570828 | 12/2019 |
| CN | 110827756 | 2/2020 |
| CN | 111061085 | 4/2020 |
| CN | 111243480 | 6/2020 |
| CN | 112365856 | 2/2021 |
| CN | 112530351 | 3/2021 |
| CN | 112767867 | 5/2021 |
| CN | 113178157 | 7/2021 |
| JP | 4487024 | 6/2010 |
| KR | 10-2019-0140760 | 12/2019 |

OTHER PUBLICATIONS

International Search Report and the Written Opinion Dated Jan. 19, 2024 From the International Searching Authority Re. Application No. PCT/CN2021/116583 and Its Translation Into English. (13 Pages).

Notification of Decision of Rejection Dated Dec. 5, 2022 From The State Intellectual Property Office of the People's Republic of China Re. Application No. 202111004841.6 and Its Translation Into English. (18 Pages).

Notification of Office Action and Search Report Dated Mar. 9, 2022 From The State Intellectual Property Office of the People's Republic of China Re. Application No. 202111004841.6 and Its Translation Into English. (18 Pages).

Notification of Office Action Dated Aug. 29, 2022 From The State Intellectual Property Office of the People's Republic of China Re. Application No. 202111004841.6 and Its Translation Into English. (18 Pages).

* cited by examiner

DISPLAY PANEL AND ELECTRONIC DEVICE

CROSS-REFERENCE TO RELATED APPLICATIONS

This application is a National Phase of PCT Patent Application No. PCT/CN2021/116583 having International filing date of Sep. 6, 2021, which claims the benefit of priority of Chinese Patent Application No. 202111004841.6 filed on Aug. 30, 2021. The contents of the above applications are all incorporated by reference as if fully set forth herein in their entirety.

TECHNICAL FIELD

The present application relates to display technical field, and particularly to a display panel and an electronic device.

BACKGROUND

Most existing Timer Control Registers (TCONs) support a Variable Refresh Rate (VRR) function, which means that refresh rate of display panels is dynamically adjusted by changing the duration of Vertical Blanking (VBlank) period in a frame period of the display panels to match the refresh rate of graphics cards, so as to solve the problems of tearing and fluctuation of images displayed by the display panels and improve smoothness of images.

However, when refresh frequency is relatively low, vertical blanking stage of the frame cycle will maintain a certain duration, during which the display panels generate leakage current, which affects display quality.

SUMMARY

A display panel and an electronic device are provided by the present application, which can compensate leakage current generated by display panels during vertical blanking stage.

A display panel is provided, including:

a data line;

a pixel unit connected to the data line, wherein the data line is configured to output a data voltage to the pixel unit during an image display period of each frame, the image display period includes a display period and a vertical blanking stage; under a first preset refresh mode, during the image display period of at least one frames, the data voltage includes a display voltage and a compensation voltage; during the display period, the data line outputs the display voltage to the pixel unit, during the vertical blanking stage, the data line outputs the compensation voltage to the pixel unit;

when the display voltage is a positive polarity voltage, a voltage value of the display voltage is less than a voltage value of the compensation voltage, when the display voltage is a negative polarity voltage, the voltage value of the display voltage is greater than the voltage value of the compensation voltage.

Optionally, in some embodiments of the present application, when the display voltage is a positive polarity voltage, the compensation voltage is a positive polarity voltage corresponding to the maximum display gray scale of the display panel;

when the display voltage is a negative polarity voltage, the compensation voltage is a negative polarity voltage corresponding to the maximum display gray scale of the display panel;

Optionally, in some embodiments of the present application, the voltage value of the compensation voltage is adjusted in real time according to the voltage value of the display voltage.

Optionally, in some embodiments of the present application, a common voltage of the display panel is zero, an absolute value of the display voltage is less than an absolute value of the compensation voltage.

Optionally, in some embodiments of the present application, the first preset refresh mode includes a first refresh mode and a second refresh mode, a refresh frequency of the first refresh mode is lower than a refresh frequency of the second refresh mode;

under the first refresh mode, the data voltage includes a first display voltage and a first compensation voltage, during the display period, the data line outputs the first display voltage to the pixel unit, during the vertical blanking stage, the data line outputs the first compensation voltage to the pixel unit; when the display voltage is a positive polarity voltage, a voltage value of the first display voltage is less than a voltage value of the first compensation voltage, when the first display voltage is a negative polarity voltage, the voltage value of the first display voltage is greater than the voltage value of the first compensation voltage;

under the second refresh mode, the data voltage includes a second display voltage and a second compensation voltage, during the display period, the data line outputs the second display voltage to the pixel unit, during the vertical blanking stage, the data line outputs the second compensation voltage to the pixel unit; when the display voltage is a positive polarity voltage, a voltage value of the second display voltage is less than a voltage value of the second compensation voltage, when the second display voltage is a negative polarity voltage, the voltage value of the second display voltage is greater than the voltage value of the second compensation voltage;

wherein a voltage difference between the first compensation voltage and the first display voltage is greater a voltage difference between the second compensation voltage and the second display voltage.

Optionally, in some embodiments of the present application, the display panel has a second preset refresh mode, a refresh frequency of the second preset refresh mode is higher than a refresh frequency of the first preset refresh mode;

under the first preset refresh mode, each of the vertical blanking stage includes a first period and a second period, a duration of the second period is equal to a duration of the vertical blanking stage in the second preset refresh mode;

during the first period, the data line outputs the compensation voltage to the pixel unit.

Optionally, in some embodiments of the present application, the display panel has a second preset refresh mode, a refresh frequency of the second preset refresh mode is higher than a refresh frequency of the first preset refresh mode;

under the second preset refresh mode, the data voltage includes a third display voltage and a third compensation voltage, during the display period, the data lines outputs the third display voltage to the pixel unit, during the vertical blanking stage, the data voltage outputs the third compensation voltage to the pixel unit;

when the third display voltage is a positive polarity voltage, a voltage value of the third display voltage is greater than a positive polarity voltage corresponding to a minimum display gray scale, when the third display voltage is a negative polarity voltage, a voltage value of the third compensation voltage is less than a negative polarity voltage corresponding to the minimum display gray scale.

Optionally, in some embodiments of the present application, the display panel includes a scanning line, the scanning line is configured to cross with the data line;

during the vertical blanking stage, the scanning line is configured to output a reference low level voltage, and a voltage value of the reference low level voltage is greater than or less than a voltage value of a preset reference low level voltage.

Optionally, in some embodiments of the present application, the first preset refresh mode includes a first refresh mode and a second refresh mode, a refresh frequency of the first refresh mode is lower than a refresh frequency of the second refresh mode;

under the first refresh mode, during the vertical blanking stage, the scanning line is configured to output a first reference low level voltage, under the second refresh mode, during the vertical blanking stage, the scanning line is configured to output a second reference low level voltage; both a voltage value of the first reference low level voltage and a voltage value of the second reference low level voltage are greater or less than the voltage value of the preset reference low level voltage.

Optionally, in some embodiments of the present application, the voltage value of the first reference low level voltage is equal to the voltage value of the second reference low level voltage.

Optionally, in some embodiments of the present application, when both the voltage value of the first reference low level voltage and the voltage value of the second reference low level voltage are less than the voltage value of the preset reference low level voltage, the voltage value of the first reference low level voltage is less than the voltage value of the second reference low level voltage;

when both the voltage value of the first reference low level voltage and the voltage value of the second reference low level voltage are greater than the voltage value of the preset reference low level voltage, the voltage value of the first reference low level voltage is greater than the voltage value of the second reference low level voltage.

Correspondingly, an electronic device is also provide by the present application, including the display panel and a driving device, the driving device is configured to provide a data voltage to the display panel, wherein the display panel includes a data line;

a pixel unit connected to the data line, wherein the data line is configured to output a data voltage to the pixel unit during an image display period of each frame, the image display period includes a display period and a vertical blanking stage; under a first preset refresh mode, during the image display period of at least one frames, the data voltage includes a display voltage and a compensation voltage; during the display period, the data line outputs the display voltage to the pixel unit, during the vertical blanking stage, the data line outputs the compensation voltage to the pixel unit;

when the display voltage is a positive polarity voltage, a voltage value of the display voltage is less than a voltage value of the compensation voltage, when the display voltage is a negative polarity voltage, the voltage value of the display voltage is greater than the voltage value of the compensation voltage.

Optionally, in some embodiments of the present application, when the display voltage is a positive polarity voltage, the compensation voltage is a positive polarity voltage corresponding to the maximum display gray scale of the display panel;

when the display voltage is a negative polarity voltage, the compensation voltage is a negative polarity voltage corresponding to the maximum display gray scale of the display panel;

Optionally, in some embodiments of the present application, the voltage value of the compensation voltage is adjusted in real time according to the voltage value of the display voltage.

Optionally, in some embodiments of the present application, a common voltage of the display panel is zero, an absolute value of the display voltage is less than an absolute value of the compensation voltage.

Optionally, in some embodiments of the present application, the first preset refresh mode includes a first refresh mode and a second refresh mode, a refresh frequency of the first refresh mode is lower than a refresh frequency of the second refresh mode;

under the first refresh mode, the data voltage includes a first display voltage and a first compensation voltage, during the display period, the data line outputs the first display voltage to the pixel unit, during the vertical blanking stage, the data line outputs the first compensation voltage to the pixel unit; when the display voltage is a positive polarity voltage, a voltage value of the first display voltage is less than a voltage value of the first compensation voltage, when the first display voltage is a negative polarity voltage, the voltage value of the first display voltage is greater than the voltage value of the first compensation voltage;

under the second refresh mode, the data voltage includes a second display voltage and a second compensation voltage, during the display period, the data line outputs the second display voltage to the pixel unit, during the vertical blanking stage, the data line outputs the second compensation voltage to the pixel unit; when the display voltage is a positive polarity voltage, a voltage value of the second display voltage is less than a voltage value of the second compensation voltage, when the second display voltage is a negative polarity voltage, the voltage value of the second display voltage is greater than the voltage value of the second compensation voltage;

wherein a voltage difference between the first compensation voltage and the first display voltage is greater a voltage difference between the second compensation voltage and the second display voltage.

Optionally, in some embodiments of the present application, the display panel has a second preset refresh mode, a refresh frequency of the second preset refresh mode is higher than a refresh frequency of the first preset refresh mode;

under the first preset refresh mode, each of the vertical blanking stage includes a first period and a second period, a duration of the second period is equal to a duration of the vertical blanking stage in the second preset refresh mode;

during the first period, the data line outputs the compensation voltage to the pixel unit.

Optionally, in some embodiments of the present application, the display panel has a second preset refresh mode, a refresh frequency of the second preset refresh mode is higher than a refresh frequency of the first preset refresh mode;

under the second preset refresh mode, the data voltage includes a third display voltage and a third compensation voltage, during the display period, the data lines outputs the third display voltage to the pixel unit, during the vertical blanking stage, the data voltage outputs the third compensation voltage to the pixel unit;

when the third display voltage is a positive polarity voltage, a voltage value of the third display voltage is greater than a positive polarity voltage corresponding to a minimum display gray scale, when the third display voltage is a negative polarity voltage, a voltage value of the third compensation voltage is less than a negative polarity voltage corresponding to the minimum display gray scale.

Optionally, in some embodiments of the present application, the display panel includes a scanning line, the scanning line is configured to cross with the data line;

during the vertical blanking stage, the scanning line is configured to output a reference low level voltage, and a voltage value of the reference low level voltage is greater than or less than a voltage value of a preset reference low level voltage.

Optionally, in some embodiments of the present application, the first preset refresh mode includes a first refresh mode and a second refresh mode, a refresh frequency of the first refresh mode is lower than a refresh frequency of the second refresh mode;

under the first refresh mode, during the vertical blanking stage, the scanning line is configured to output a first reference low level voltage, under the second refresh mode, during the vertical blanking stage, the scanning line is configured to output a second reference low level voltage; both a voltage value of the first reference low level voltage and a voltage value of the second reference low level voltage are greater or less than the voltage value of the preset reference low level voltage.

A display panel and an electronic device are provided by the present application. The display panel includes a data line and a pixel unit connected to the data line. Wherein, the data line is configured to output data voltage to the pixel unit during the image display period of each frame. The image display period includes a display period and a vertical blanking stage. In the image display period of at least one frames under the first preset refresh mode, during the display period, the data line is configured to output display voltage to the pixel unit, and during the vertical blanking stage, the data line is configured to output compensation voltage to the pixel unit. And when the display voltage is a positive polarity voltage, a voltage value of the display voltage is less than a voltage value of the compensation voltage, when the display voltage is a negative polarity voltage, the voltage value of the display voltage is greater than the voltage value of the compensation voltage. Thus, compensation for leakage generated by the display panel during the vertical blanking stage is provided by means of micro charging, improving the display effect of the display panel.

BRIEF DESCRIPTION OF THE DRAWINGS

In order to more clearly illustrate the technical solution of this disclosure, a brief description of the drawings that are necessary for the illustration of the embodiments will be given as follows. Obviously, the drawings described below show only some embodiments of this disclosure, and a person having ordinary skill in the art may also obtain other drawings based on the drawings described without making any creative effort.

DETAILED DESCRIPTION

The present disclosure is further described in detail below with reference to the accompanying drawings and embodiments. A person having ordinary skill in the art may obtain other embodiments based on the embodiments provided in the present application without making any creative effort, which all belong to the scope of the present application. In addition, it should be understood that the specific embodiments described herein are only used to illustrate and explain the present application and are not used to limit the present application. In addition, the terms “first” and “second” are only used for descriptive purposes and cannot be understood as indicating or implying relative importance or implicitly indicating the number of indicated technical features. Thus, the features defining “first” and “second” may explicitly or implicitly include one or more of the features.

A display panel and an electronic device are provided by the present application, which are described in detail. It should be noted that the order of description of the following embodiments is not a limitation of the preferred order of the embodiments of the present application.

Figure 1:
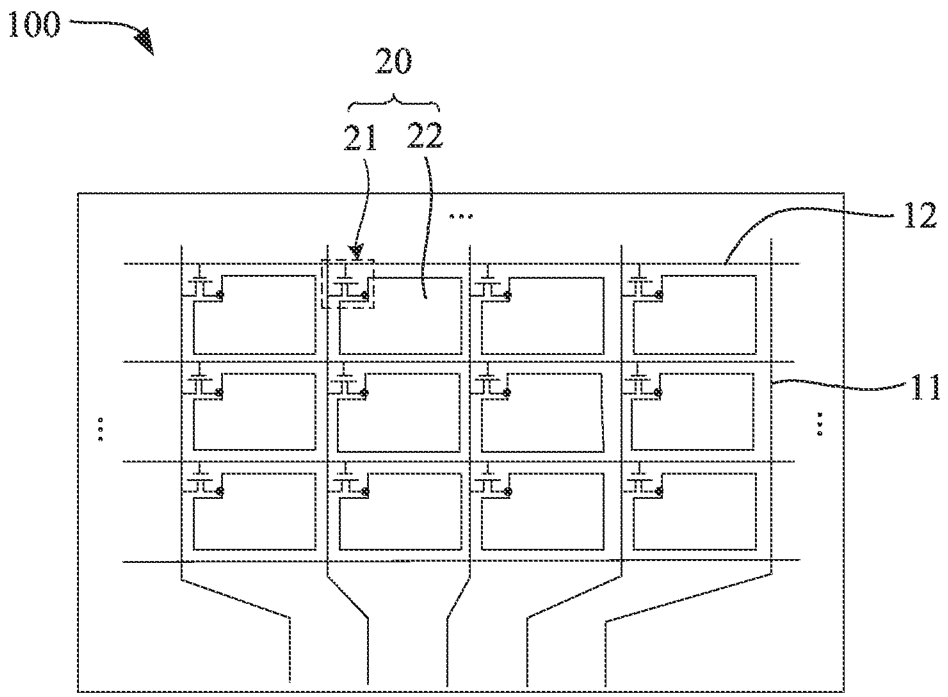
FIG. 1 is a structural schematic diagram of a display panel provided by the present application.
Figure 2:
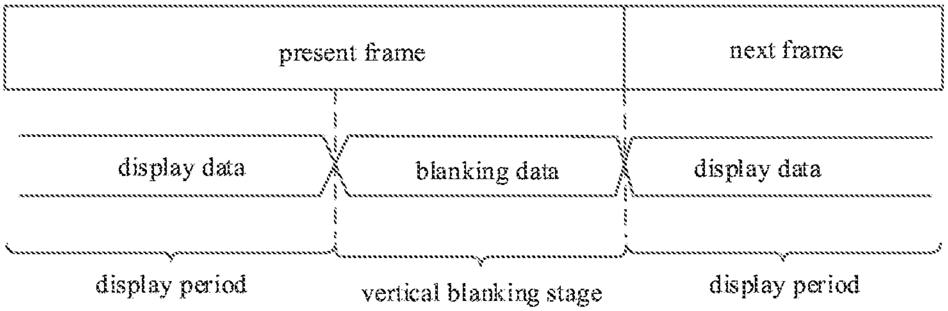
FIG. 2 is a structural schematic diagram of an image display period of the display panel provided by the present application.
Figure 3:
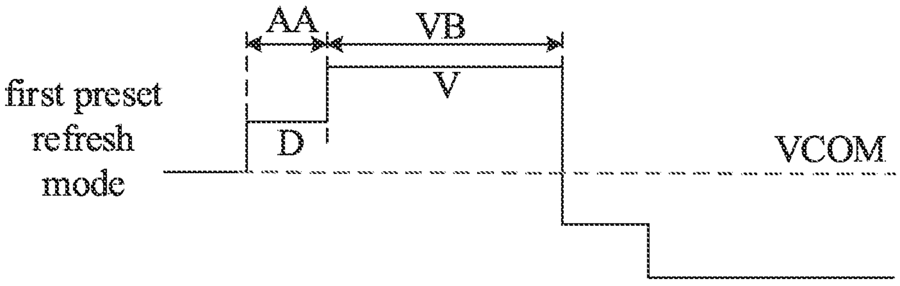
FIG. 3 is a first sequence diagram of a driving signal of the display panel provided by the present application.

Please refer to FIG. 1 to FIG. 3, FIG. 1 is a structural schematic diagram of a display panel provided by the present application. FIG. 2 is a structural schematic diagram of an image display period of the display panel provided by the present application. FIG. 3 is a first sequence diagram of a driving signal of the display panel provided by the present application.

Wherein, a display panel 100 includes a data line 11 and a pixel unit 20. The pixel unit 20 is connected to the data line 11. The data line 11 is configured to output data voltage to the pixel unit 20 during an image display period of each frame. The image display period includes a display period AA and a vertical blanking stage VB. Under a first preset refresh mode, during the image display period of at least one frames, the data voltage includes a display voltage D and a compensation voltage V. During the display period AA, the data line 11 outputs the display voltage D to the pixel unit 20. During the vertical blanking stage VB, the data line 11 outputs the compensation voltage V to the pixel unit 20. When the display voltage D is a positive polarity voltage, a voltage value of the display voltage D is less than a voltage value of the compensation voltage V. When the display voltage D is a negative polarity voltage, the voltage value of the display voltage D is greater than the voltage value of the compensation voltage V.

Specifically, the display panel 100 further includes a scanning line 12. The pixel unit 20 is defined by the crossed data line 11 and scanning line 12. The pixel unit 20 includes a transistor 21 and a pixel electrode 22. A control terminal of the transistor 21 is connected to the scanning line 12. An input terminal of the transistor 21 is connected to the data line 11. An output terminal of the transistor 21 is connected to the pixel electrode 22. This is a well-known technology to those skilled in the art and will not be described here.

Wherein, during the image displaying of the display panel 100, refresh speed of display images is decided by refresh rate. Wherein, the higher the refresh rate, the higher the refresh speed of display image is, namely, the more frequently the display images are switched.

Wherein, numbers of the data lines 11, the scanning lines 12 and the pixel units 20 can be designed according to size and resolution of the display panel 100. The data line 11 and the scanning line 12 can cross to each other vertically, or only cross to each other but not vertically. The accompanying drawings are only examples and cannot be understood as limitation to the present application. Besides, 1G1D (one gate one data, one gate line with one data line) driving architecture can be applied in the display panel 100 provided by the present application, but the present application is not limited to this. For example, HG2D (half gate two data, half gate electrode with two data lines) driving architecture can also be applied in the display panel 100 of the present application, which is no longer described in detail herein.

Wherein, during the display period AA of each frame, the scanning line 12 is configured to output scanning signal. The scanning signal turns on the transistor 21, so as to turn on the pixel unit 20 row-by-row. The data line 11 is configured to output data voltage to charge the corresponding pixel unit 20. During the vertical blanking stage VB of each frame, all of the transistor 21 are turned off. The pixel unit 20 maintains the display image of current frame.

Specifically, each frame of the display panel 100 includes the display period AA and the vertical blanking stage VB. During the display period AA of each frame, a plurality of data lines 11 are configured to output display data corresponding to each row of the pixel units 20 respectively, for example, red, green and blue (RGB) display voltage, so as to light all of the pixel units 20 within one frame. During the vertical blanking stage VB, the plurality of data lines 11 are configured to output blanking data corresponding to each row of the pixel units 20 respectively, for example, the blanking data corresponding to each row of the pixel units 20 are 0th gray scale signal (the minimum grayscale signal), namely, the black scale signal. Only when display data of the pixel units 20 in a same row of next frame comes, content of the pixel units 20 in right this row of last frame is overwritten. Therefore, in ideal conditions, during the vertical blanking stage VB, the potential of the pixel electrode 22 of each of the pixel units 20 maintains the potential of the display voltage of current frame.

However, due to the switching characteristics of the transistor 21, the transistor 21 cannot be completely turned off during the vertical blanking stage VB of each frame, there will be certain leakage current. It can be understood that the display panel 100 is a liquid crystal display panel. When the liquid crystal display panel displays, brightness is determined by voltage difference applied to both sides of the liquid crystals. Voltage of one side of the liquid crystals is constant, which is a common voltage VCOM. Voltage of another side is the voltage of the pixel electrode 22. When there is leakage current at the pixel electrode 22, the voltage difference between the pixel electrode 22 and the common voltage VCOM will decrease, leading to a decrease in brightness of the pixel unit 20. Besides, due to the characteristics of the liquid crystals, it is necessary to continuously and alternately provide positive and negative polarity voltages to the pixel unit 20. Wherein, a voltage with a voltage value greater than the common voltage VCOM is defined as a positive polarity voltage, and a voltage with a voltage value less than the common voltage VCOM is defined as a negative polarity voltage.

Thus, under the first preset refresh mode, during the image display period of at least one frames, when the display voltage D is a positive polarity voltage, a voltage value of the display voltage D is less than a voltage value of the compensation voltage V. A voltage of the input terminal of the transistor 21 is greater than a voltage of the output terminal of the transistor 21, leakage current occurs from the input terminal of the transistor 21 to the output terminal. Potential of the pixel electrode 22 is increased by means of micro charging, the voltage difference between two sides of the liquid crystals is increased, and brightness of the pixel electrode 20 is increased. When the display voltage D is a negative polarity voltage, the voltage value of the display voltage D is configured to be greater than the voltage value of the compensation voltage V. The voltage of the input terminal of the transistor 21 is less than the voltage of the output terminal of the transistor 21, leakage current occurs from the output terminal of the transistor 21 to the input terminal. Potential of the pixel electrode 22 is decreased, the voltage difference between two sides of the liquid crystals is increased similarly, and brightness of the pixel electrode 20 is increased. Thus, compensation is provided to the leakage current of the pixel electrode 22 during the vertical blanking stage VB, to improve display effect of the display panel 100.

It should be noted that as the source electrode and the drain electrode of the transistor are symmetric, the source electrode and the drain electrode can be interchangeable. In the present application, in order to distinguish the two electrodes of the transistor except the gate electrode, one of them is called the source electrode and the other one is called the drain electrode. In the present application, the control terminal of the transistor 21 is the gate electrode, the input terminal of the transistor 21 is the source electrode, and the output terminal of the transistor 21 is the drain electrode.

Besides, the transistors applied in the present application can include P-type transistor and/or N-type transistor, wherein the P-type transistor is turned on when the gate electrode is low level, and is turned off when the gate electrode is high level, the N-type transistor is turned on when the gate electrode is high level, and is turned off when the gate electrode is low level. It should be noted that the transistors in the following embodiments of the present application are described by taking N-type transistors as examples, but they cannot be understood as limitations on the present application.

It can be understood that the voltage value of the common voltage VCOM of the display panel 100 need to be designed according to display requirements to the display panel 100. When the common voltage COM of the display panel 100 is 0, the absolute value of the display voltage D is less than the absolute value of the compensation voltage V.

Certainly, the common voltage COM of the display panel 100 cannot be configured to be 0. For example, in some of the embodiments, the common voltage VCOM of the display panel 100 is configured to be 7V or other numbers, which needs to meet the requirement that when the display voltage D is a positive polarity voltage, the voltage value of the display voltage D is less than the voltage value of the compensation voltage V. When the display voltage D is a negative polarity voltage, the voltage value of the display voltage D is greater than the voltage value of the compensation voltage V.

In the present application, under the first preset frequency mode, compensation to leakage is only provided to the image display period of at least one frames to reduce the power consumption of the display panel 100. Under the first preset frequency mode, compensation to leakage is provide to the image display period of all frames to ensure display brightness of the display panel 100 to the greatest extent under the first preset frequency mode. The following embodiments of the present application take that compensation to leakage is provided the pixel electrode 22 during the vertical blanking stage VB of the image display period of each frame as an example, but it cannot be understood as a limitation to the present application.

In the present application, when the display voltage D is a positive polarity voltage, the compensation voltage V is a positive polarity voltage corresponding to the maximum display gray scale of the display panel 100. When the display voltage D is a negative polarity voltage, the compensation voltage V is a negative polarity voltage corresponding to the maximum display gray scale of the display panel 100.

For example, if an image display data input to the display panel 100 is written binary 8 bit, eighth power of 2 brightness gray scales from the darkest to the brightest will be generated. Which is different brightness gray scales of 256 level (for example, it can be written as 0th gray scale to 255th gray scale). Wherein, it is assumed that the display brightness corresponding to the 255th gray scale is the maximum brightness, that is, the voltage value corresponding to the 255th gray scale is the greatest. Certainly, the image display data received by the display panel 100 of the present application can be written in binary 6 bit, binary 10 bit, etc. It should be noted that the present application are described by taking binary 8 bit as examples, but they cannot be understood as limitations to the present application.

It can be understood that during the image display period of each frame under the first preset frequency mode, each of the pixel units 20 is corresponding to each of the display voltage D. The display voltage D can be any gray scale voltage from 0th gray scale to 255th gray scale. In the present application, the compensation voltage V is configured according to the maximum gray scale of the display panel 100. For example, when the display voltage D is a positive polarity voltage, the compensation voltage V is configured as the positive polarity voltage corresponding to the maximum display gray scale of the display panel 100, to ensure the voltage of the input terminal of each of the transistors 21 is greater than or equal to the voltage of the output terminal. Thus, leakage current is generated from the input terminal of the transistor 21 to the output terminal, so as to micro charge the pixel electrode 22, and to increase potential of the pixel electrode 22, so as to provide a compensation to the leakage of the pixel electrode 22 during the vertical blanking stage VB under the first refresh mode. Which is same when the display voltage D is a negative polarity voltage, which is no longer described in detail herein.

In addition, taking the positive polarity voltage as an example, in the driving device of the display panel 100, it is usually necessary to design a logic circuit to estimate and output the compensation voltage V corresponding to each of the pixel units 20, so as to ensure that the voltage value of the compensation voltage V corresponding to each of the pixel units 20 is greater than the voltage value of corresponding display voltage D. In the present application, all of the compensation voltage V is configured as the positive polarity voltage corresponding to the maximum display gray scale of the display panel 100. On one hand, the logic circuit can be simplified and the complexity of signals of the display panel 100 can be reduced. On the other hand, it is ensured that the voltage value of the compensation voltage V corresponding to each of the pixel units 20 is greater than the voltage value of corresponding display voltage D to achieve the compensation effect.

Certainly, in other embodiments of the present application, the voltage value of the compensation voltage V can be real-time adjusted according to the voltage value of the display voltage D. Namely, the compensation voltage V can be configured against display voltage D corresponding to each of the pixel units 20, as long as it is ensured that the voltage value of the compensation voltage V is greater than the voltage value of the display voltage D to lower the power consumption of the display panel 100.

In the present application, the first preset frequency mode can only include one refresh mode. Under the refresh mode, a compensation to leakage of the display panel 100 is provided by means of micro charge to improve the display brightness of the display panel 100.

Certainly, the first preset frequency mode can include a plurality of refresh mode. It can be understood that under different refresh frequency, the duration of the vertical blanking stage of image display period are different, which causes leakage current of different levels. Leakage current of different levels may induce different brightness in display image of the display panel. Therefore, when the frequency of the display panel changes, flickers will occur in the display panel.

Figure 4:
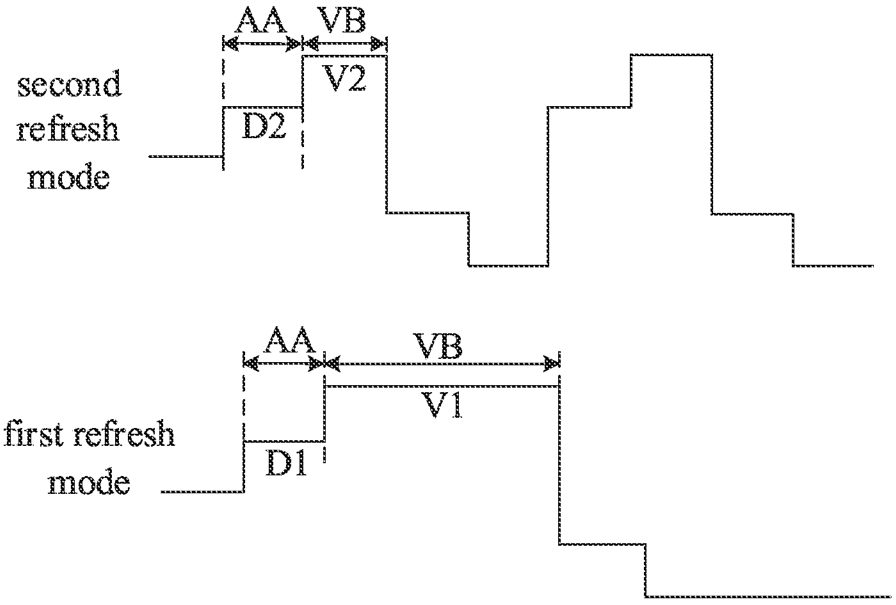
FIG. 4 is a second sequence diagram of the driving signal of the display panel provided by the present application.

Hereto, please refer to FIG. 1 and FIG. 4, FIG. 4 is a second sequence diagram of the driving signal of the display panel provided by the present application. Difference between the display panel 100 of FIG. 4 and the display panel 100 of the FIG. 3 is that: in the embodiment, the first preset refresh mode includes a first refresh mode and a second refresh mode. A refresh frequency of the first refresh mode is lower than a refresh frequency of the second refresh mode.

Wherein, under the first refresh mode, the data voltage includes a first data voltage D1 and a first compensation voltage V1. During the display period AA, the data line 11 outputs the first display voltage D1 to the pixel unit 20. During the vertical blanking stage VB, the data line 11 outputs the first compensation voltage V1 to the pixel unit 20. When the first display voltage D1 is a positive polarity voltage, a voltage value of the first display voltage D1 is less than a voltage value of the first compensation voltage V1. When the first display voltage D1 is a negative polarity voltage, the voltage value of the first display voltage D1 is greater than the voltage value of the first compensation voltage V1.

Wherein, under the second refresh mode, the data voltage includes a second data voltage D2 and a second compensation voltage V2. During the display period AA, the data line 11 outputs the second display voltage D2 to the pixel unit 20. During the vertical blanking stage VB, the data line 11 outputs the second compensation voltage V2 to the pixel unit 20. When the second display voltage D2 is a positive polarity voltage, a voltage value of the second display voltage D2 is less than a voltage value of the second compensation voltage V2. When the second display voltage D1 is a negative polarity voltage, the voltage value of the second display voltage D2 is greater than the voltage value of the second compensation voltage V2.

As the refresh frequency of the first refresh mode is lower than the refresh frequency of the second refresh mode, a duration of each vertical blanking stage VB of the first refresh mode is longer than a duration of each vertical blanking stage VB of the second refresh mode. The longer the duration of the vertical blanking stage, the longer the duration of the present display image of the display panel 100 is. And the longer the duration of which the voltage applied on the pixel electrode 22 is. At the same time, the worse the leakage current of the transistor 21 is. That is, the brightness of the pixel electrode 22 decreases more in the first refresh mode than in the second refresh mode.

In addition, in addition to the leakage caused by incomplete close of the transistor 21, there are other factors causing leakage in the display panel 100, for example, light will also induce leakage, etc. Similarly, since the duration of the vertical blanking period VB of the first refresh mode is longer, compared to the second refresh mode, the pixel electrode 22 in the first refresh mode will also generate more leakage in the vertical blanking period VB.

Therefore, compensation to leakage of the pixel electrode 22 is provide by means of micro charge both in the first refresh mode and the second refresh mode in this embodiment, the potential difference of the pixel electrodes 22 under the first refresh mode and the second refresh mode induced by leakage of the transistor 21 can be reduced. At the same moment, compensation is provide to the pixel electrode 22 under the first refresh mode and the second refresh mode to achieve the balance between compensation and leakage, so as to improve the overall display effect of the display panel 100.

Furthermore, in some embodiments of the present application, a voltage difference between the first compensation voltage V1 and the first display voltage D1 is greater than a voltage difference between the second compensation voltage V2 and the second display voltage D2.

It can be understood that micro current compensation can be provided to the pixel electrode 22 according to the leakage characteristic of the transistor 21. The greater the voltage difference between the input terminal and the output terminal of the transistor 21, the greater the leakage current is, the better the compensation effect on the pixel electrode 22 is. Since the duration of each vertical blanking stage VB under the first refresh mode is longer, the leakage of the pixel electrode 22 under the first refresh mode is worse than the leakage of the pixel electrode 22 under the second refresh mode. Therefore, the voltage difference between the first compensation voltage V1 and the first display voltage D1 is configured to be greater than the voltage difference between the second compensation voltage V2 and the second display voltage D2, charging to the pixel electrode 22 under the first refresh mode can be increased to improve the compensation to the pixel electrode 22 under the first refresh mode, so as to further reduce the brightness difference between display images of the display panel 100 under various refresh frequency.

Certainly, in other embodiments of the present application, when there is a great brightness difference between the first refresh mode and the second refresh mode, the compensation can be provided to the pixel unit 20 only under the first refresh mode, to avoid flickers in images while switching images.

In the present application, the duration of the display period AA under the first refresh mode and the second refresh mode are identical. Namely, the charging time to the pixel unit 20 under the first refresh mode and the second refresh mode are identical. Thus, the refresh frequency of the display panel 100 is dynamically adjusted by only changing the duration of the vertical blanking period VB in the frame cycle of the display panel 100.

Figure 5:
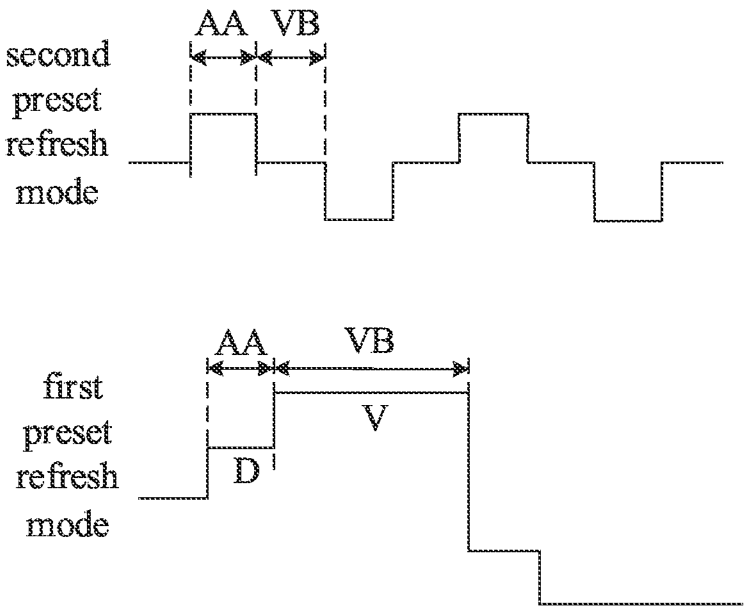
FIG. 5 is a third sequence diagram of the driving signal of the display panel provided by the present application.

Please refer to FIG. 1 and FIG. 5, FIG. 5 is a third sequence diagram of the driving signal of the display panel provided by the present application. Difference between the display panel 100 of FIG. 5 and the display panel 100 of the FIG. 3 is that: in the embodiment, the display panel has a second preset refresh mode. A refresh frequency of the second preset refresh mode is higher than the refresh frequency of the first preset refresh mode.

Only in the vertical blanking stage VB of at least one frames under the first preset refresh mode, the compensation voltage V is provided to the pixel unit 20 in the present application, compensation to leakage of the pixel electrode 22 during the vertical blanking stage VB are provided by means of micro charge to decrease the brightness difference of the display panel 100 under the first preset refresh mode and the second preset refresh mode, to avoid flickers in images while switching images.

Figure 6:
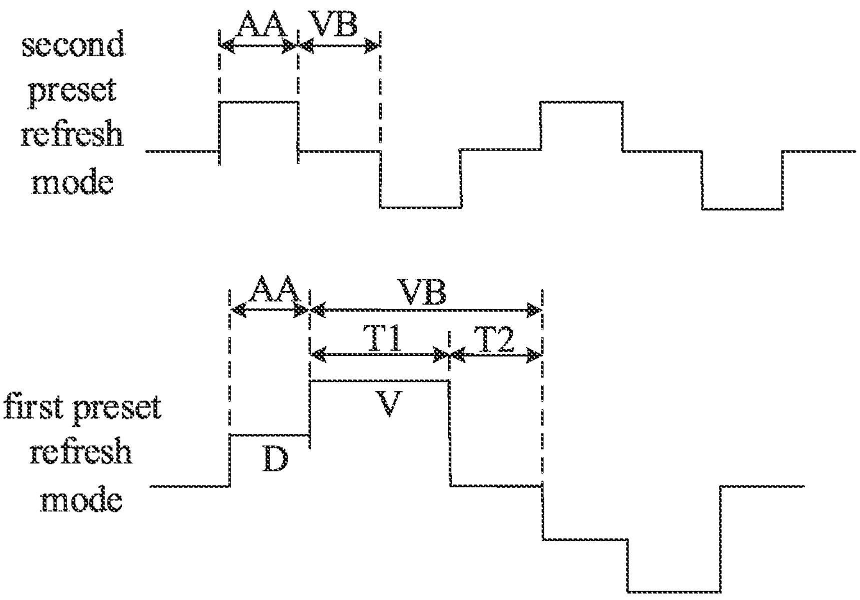
FIG. 6 is a fourth sequence diagram of the driving signal of the display panel provided by the present application.

Furthermore, please refer to FIG. 1 and FIG. 6, FIG. 6 is a fourth sequence diagram of the driving signal of the display panel provided by the present application. Difference between the display panel 100 of FIG. 6 and the display panel 100 of the FIG. 5 is that: in the embodiment, in the first preset refresh mode, each of the vertical blanking stage VB includes a first time period T1 and a second time period T2. A duration of the second time period T2 is equal to the duration of the vertical blanking stage VB under the second preset refresh mode. During the first time period T1, the data line 11 outputs the compensation voltage V to the pixel unit 20.

It can be understood that the leakage of the pixel electrode 22 under the first refresh mode and the second refresh mode are different, mainly because the duration of each of the vertical blanking stage VB of the first refresh mode is longer than the duration of each of the vertical blanking stage VB of the second refresh mode. Therefore, a first compensation voltage V1 is configured for the data line 11 during the first time period T1 in this embodiment, and the duration of the second time period T2 is configured to be equal to the duration of each of the vertical blanking stage VB under the second refresh mode. On one hand, the duration of leakage of the pixel electrode 22 induced by the transistor 21 under the first preset refresh mode and the second preset refresh mode are identical, so as to reduce leakage difference caused by the transistor 21. On the other hand, micro charge compensation can be provided to the pixel electrode 22 during the first time period T1 to compensate the leakage of the pixel electrode 22 caused by other factors under the first refresh mode to further reduce leakage difference between the pixel electrode 22 under the preset first refresh mode and the second preset refresh mode, so as to reduce brightness difference of display images of the display panel 100 under different refresh frequency.

Figure 7:
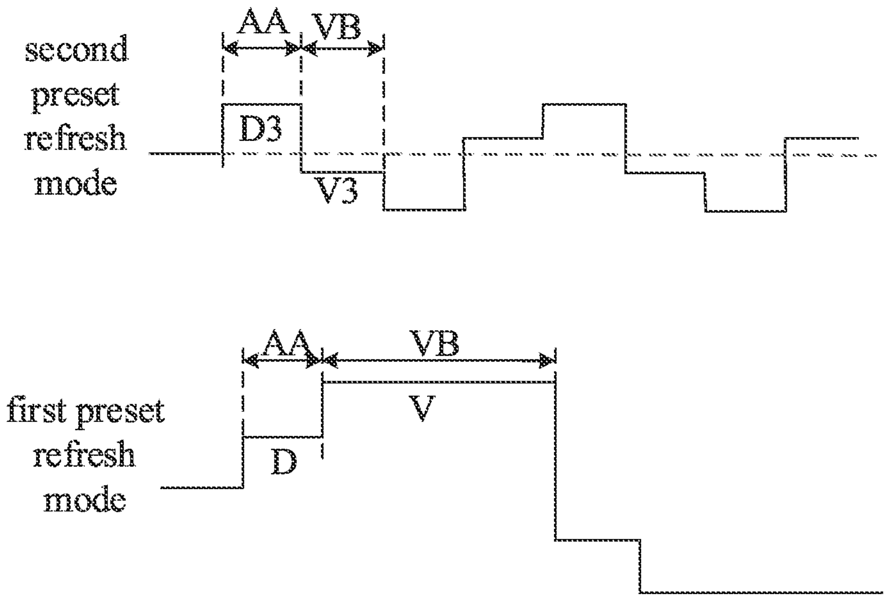
FIG. 7 is a fifth sequence diagram of the driving signal of the display panel provided by the present application.

Please refer to FIG. 1 and FIG. 7, FIG. 7 is a fifth sequence diagram of the driving signal of the display panel provided by the present application. Difference between the display panel 100 of FIG. 7 and the display panel 100 of the FIG. 5 is that: in the embodiment, under the second preset refresh mode, the data voltage includes a third display voltage D3 and a third compensation voltage D3. During the display period AA, the data line 11 outputs the third display voltage D3 to the pixel unit 20. In the vertical blanking stage VB, the data line 11 outputs the third compensation voltage V3 to the pixel unit 20.

When the third display voltage D3 is a positive polarity voltage, a voltage value of the third compensation voltage V3 is greater than the positive polarity voltage corresponding to the minimum display gray scale of the display panel 100. When the third display voltage D3 is a negative polarity voltage, a voltage value of the third compensation voltage V3 is less than the negative polarity voltage corresponding to the minimum display gray scale of the display panel 100.

It can be understood that, in the vertical blanking stage VB, the data lines are configured to output black gray scale signal to the pixel unit 20, namely, the minimum display gray scale of the display panel 100. Therefore, when the third display voltage D3 is a positive polarity voltage, the voltage value of the third compensation voltage V3 is configured to be greater than the positive polarity voltage corresponding to the minimum display gray scale of the display panel 100, which aggravates the leakage of the pixel electrode 22 during the vertical blanking stage VB. That is, by improving the leakage of the display panel 100 under the second preset refresh mode, the leakage difference of the pixel electrode 22 between the first preset refresh mode and the second preset refresh mode is reduced. Similarly, when the third display voltage D3 is a negative polarity voltage, the voltage value of the third compensation voltage V3 is configured to be less than the negative polarity voltage corresponding to the minimum display gray scale of the display panel 100, which aggravates the leakage of the pixel electrode 22 during the vertical blanking stage VB.

Certainly, in other embodiments of the present application, in order to decrease power consumption of the display panel 100, when the brightness difference between the first refresh mode and the second refresh mode is relatively small, further compensation to leakage can only be provided to the pixel unit 20 under the second refresh mode, to reduce the leakage difference between the pixel electrode 22 under the first refresh mode and the second refresh mode.

Furthermore, in the present application, during the vertical blanking stage VB of the image display period of each frame, the scanning line 12 outputs corresponding reference low level voltage to turn off the transistor 21. The potential of the reference low level voltage can be designed according to the switching characteristics of the transistor 21.

Figure 8:
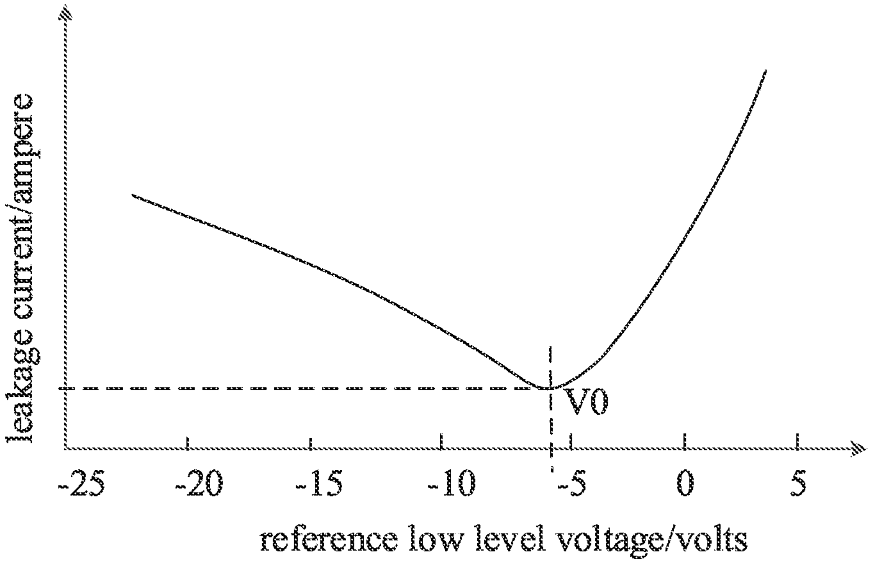
FIG. 8 is a schematic diagram of a leakage current curve of an N-type transistor provided by the present application.

Specifically, please refer to FIG. 8, FIG. 8 is a schematic diagram of a leakage current curve of an N-type transistor provided by the present application. Wherein, the abscissa is a voltage value of the reference low level voltage, in volts (V). The ordinate is the leakage current of the transistor 21, in ampere (I). As shown in FIG. 6, when the transistor 21 is turned off, it is not in a completely off state, certain off state leakage current will still be generated. However, as to the transistor 21, under the control of the preset reference low level voltage V0, the transistor 21 has a minimum leakage current.

Figure 9:
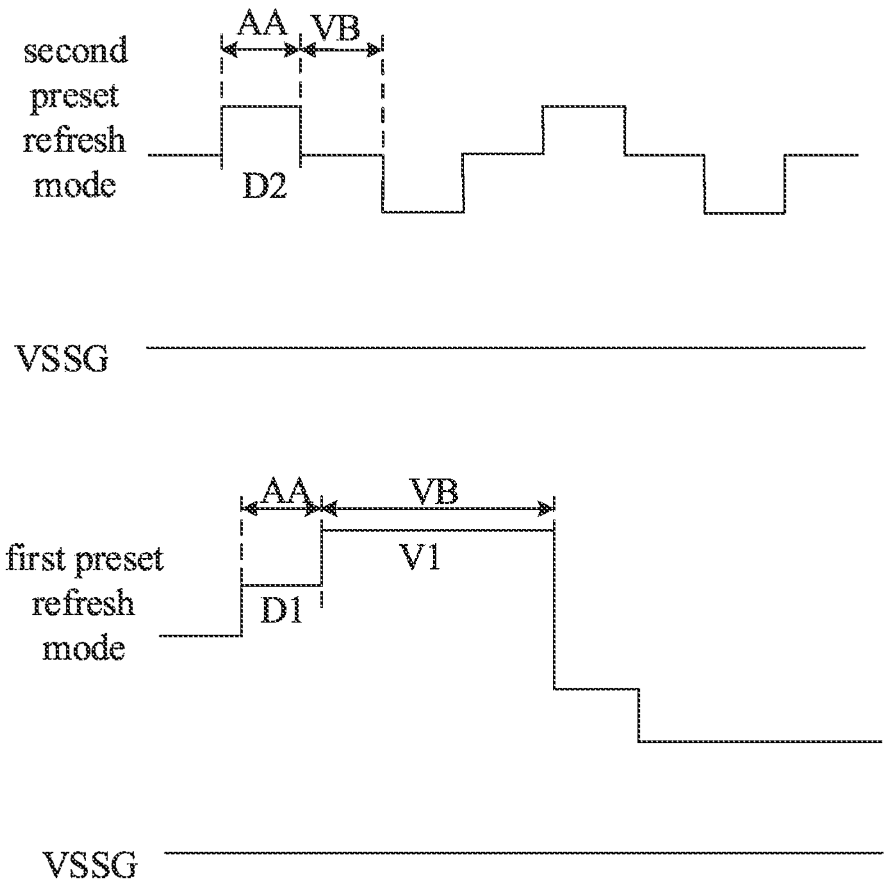
FIG. 9 is a sixth sequence diagram of the driving signal of the display panel provided by the present application.

Hereto, please refer to FIG. 1 and FIG. 9, FIG. 9 is a fourth sequence diagram of the driving signal of the display panel provided by the present application. Difference between the display panel 100 of FIG. 9 and the display panel 100 of the FIG. 6 is that: in the embodiment, during the vertical blanking stage VB of one frame, the data line 12 is configured to output the reference low level voltage VSSG. The voltage value of the reference low level voltage VSSG is greater than or less than a voltage value of a preset reference low level voltage V0.

In this regard, it can be understood that the leakage of the transistor 21 is taken advantage, and micro charging compensation is provide to the pixel electrode 22 within the vertical blanking stage VB in the embodiment. As the preset reference low level voltage V0 is corresponding to the minimum leakage current of the transistor 21, the voltage value of the reference low level voltage VSSG is configured to be greater or less than the voltage value of the preset reference low level voltage V0, which improves the leakage of the transistor 21, by improving the compensation to the potential of the pixel electrode 22, the brightness of the display panel 100 is prevented from decreasing.

It should be noted that the leakage current curve of a P-type transistor is similar to the leakage current curve of the N-type transistor, which will not be repeated here.

Figure 10:
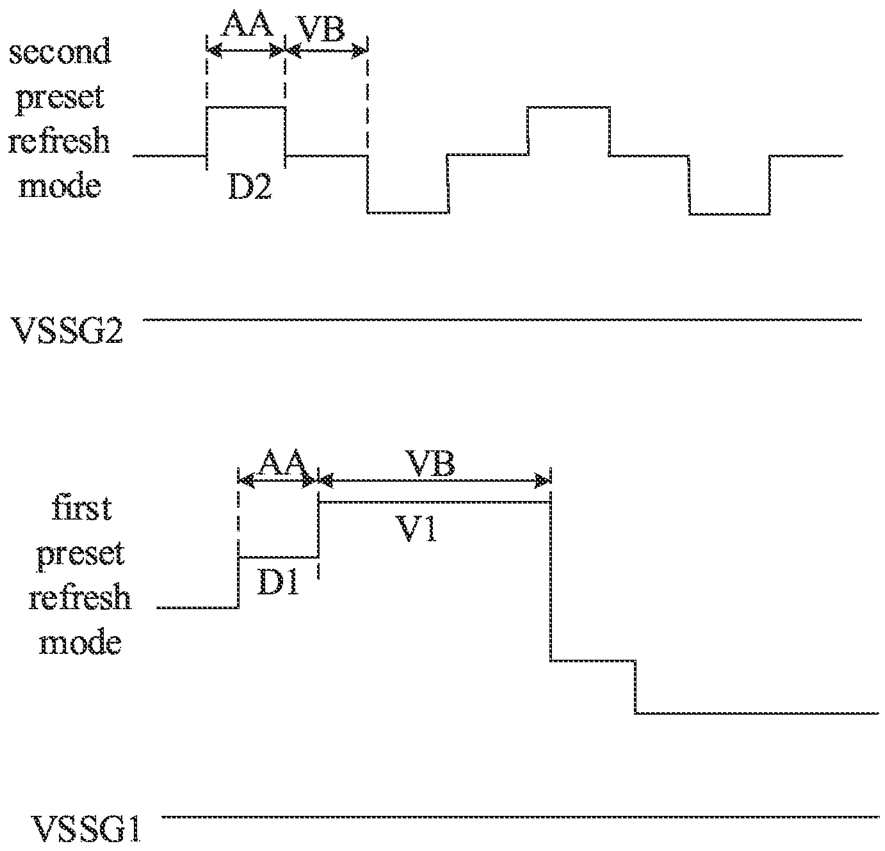
FIG. 10 is a seventh sequence diagram of the driving signal of the display panel provided by the present application.

Please refer to FIG. 1 and FIG. 10, FIG. 10 is a fifth sequence diagram of the driving signal of the display panel provided by the present application. Difference between the display panel 100 of FIG. 10 and the display panel 100 of the FIG. 9 is that: in the embodiment, under the first preset refresh mode, during the vertical blanking stage VB of each frame, the data line 12 is configured to output the first reference low level voltage VSSQ1. Under the second preset refresh mode, during the vertical blanking stage VB of each frame, the data line 12 is configured to output the second reference low level voltage VSSQ2.

Wherein, a voltage value of the first reference low level voltage VSSQ1 is greater than or less than a voltage value of the preset reference low level voltage V0. A voltage value of the second reference low level voltage VSSQ2 is greater than or less than the voltage value of the preset reference low level voltage V0.

It can be known from the above analysis that under the driving of the preset reference low level voltage V0, the leakage current of the transistor 21 in the off state can be minimized. Therefore, the voltage value of the first reference low level voltage VSSQ1 is configured to be greater than or less than the voltage value of the preset reference low level voltage V0 to improve the leakage of the transistor 21 during the vertical blanking stage VB under the first refresh mode. Similarly, the voltage value of the second reference low level voltage VSSQ2 is configured to be greater than or less than the voltage value of the preset reference low level voltage V0 to improve the leakage of the transistor 21 during the vertical blanking stage VB under the second refresh mode.

Furthermore, in some embodiments of the present application, the voltage value of the first reference low level voltage VSSQ1 and the voltage value of the second reference low level voltage VSSQ2 are identical.

It can be understood that in the driving device of the display panel 100, it is usually necessary to design a logic circuit to output the corresponding reference low level voltage VSSQ1 and reference low level voltage VSSQ2. The voltage value of the reference low level voltage VSSQ1 and the voltage value of the reference low level voltage VSSQ2 can be configured to be identical, so that the logic circuit can be simplified and the complexity of signals in the display panel 100 can be reduced.

In some embodiments of the present application, both the voltage value of the first reference low level voltage VSSQ1 and the voltage value of the second reference low level voltage VSSQ2 are less than the voltage value of the reference low level voltage VSSQ, and the voltage value of the first reference low level voltage VSSQ1 is less than the voltage value of the second reference low level voltage VSSQ2.

It can be known from the analysis, when both the voltage value of the first reference low level voltage VSSQ1 and the voltage value of the second reference low level voltage VSSQ2 are less than the voltage value of the reference low level voltage V0, the voltage value of the first reference low level voltage VSSQ1 is configured to be less than the voltage value of the second reference low level voltage VSSQ2, the leakage current of the transistor 21 under the control of first reference low level voltage VSSQ1 is greater than the leakage current of the transistor 21 under the control of the second reference low level voltage VSSQ2.

It can be understood that micro charging compensation can be provided to the pixel electrode 22 through the leakage of the transistor 21. The greater the leakage current of the transistor 21, the better the compensation effect is. As the leakage of the pixel electrode 22 under the first refresh mode is greater than the leakage of the pixel electrode 22 under the second refresh mode, the voltage value of the first reference low level voltage VSSQ1 is configured to be less than the voltage value of the second reference low level voltage VSSQ2, the charging to the pixel electrode 22 under the first refresh mode can be increased to improve the compensation to the pixel electrode 22 under the first refresh mode, so as to further reduce the brightness difference between display images of the display panel 100 under various refresh frequency.

In some embodiments of the present application, both the voltage value of the first reference low level voltage VSSQ1 and the voltage value of the second reference low level voltage VSSQ2 are greater than the voltage value of the reference low level voltage V0, and the voltage value of the first reference low level voltage VSSQ1 is greater than the voltage value of the second reference low level voltage VSSQ2.

It can be known from the analysis, when both the voltage value of the first reference low level voltage VSSQ1 and the voltage value of the second reference low level voltage VSSQ2 are greater than the voltage value of the reference low level voltage V0, the voltage value of the first reference low level voltage VSSQ1 is configured to be greater than the voltage value of the second reference low level voltage VSSQ2, the leakage current of the transistor 21 under the control of first reference low level voltage VSSQ1 is greater than the leakage current of the transistor 21 under the control of the second reference low level voltage VSSQ2.

It can be understood that micro charging compensation can be provided to the pixel electrode 22 through the leakage of the transistor 21. The greater the leakage current of the transistor 21, the better the compensation effect is. As the leakage of the pixel electrode 22 under the first refresh mode is greater than the leakage of the pixel electrode 22 under the second refresh mode. Therefore, the voltage value of the first reference low level voltage VSSQ1 is configured to be greater than the voltage value of the second reference low level voltage VSSQ2, the charging to the pixel electrode 22 under the first refresh mode can be improved to increase the compensation to the pixel electrode 22 under the first refresh mode, so as to further reduce the brightness difference between display images of the display panel 100 under various refresh frequency.

Correspondingly, an electric device is also provided by the present application, including a display panel and a driving device. The driving device is configured to provide driving signals to the display panel. The driving signals can be the reference low level voltage, the first display voltage, the first compensation voltage, the second display voltage, and the second compensation voltage, etc. The display panel is the display panel described in anyone of the above embodiments, which is no longer described in detail herein.

The electronic device in the present application can be smart phone, tablet computer, video player, personal computer (PC), etc., which is not limited in the present application.

Figure 11:
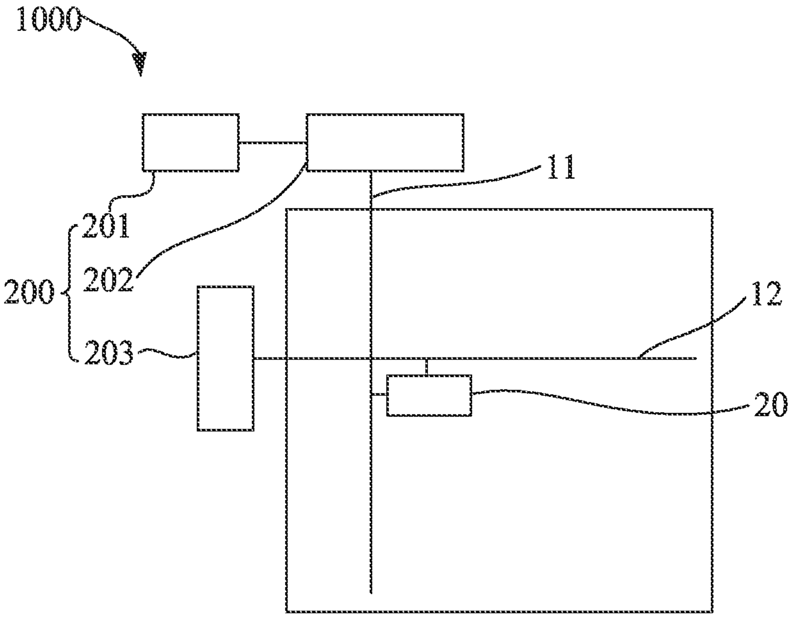
FIG. 11 is a structural schematic diagram of an electronic device provided by the present application.

Specifically, please refer to FIG. 11, FIG. 11 is a structural schematic diagram of an electric device provided by the present application. Wherein, the electronic device 1000 includes a display panel 100 and a driving device 200. The driving device 200 is configured to provide driving signals to the display panel.

The driving device 200 includes, but is not limited to a timing controller 201, a data driving circuit 202, and a gate driving circuit 203. Specifically, the timing controller 201 is configured to provide display data to the data driving circuit 202. The data driving circuit 202 is configured to output the data voltage to the pixel unit 20 through the data line 11 during the display period of each frame. The data driving circuit 202 is also configured to output the compensation voltage to the pixel unit 20 through the data line 11 in the vertical blanking stage of each frame. The gate driving circuit 203 is used to output a scanning signal such as reference low level voltage to the scanning line 12.

Certainly, in other embodiments, an array substrate gate driver on array (GOA) can be integrated in the display panel 100 to replace the gate driver 203, so as to realize a narrow frame.

An electric device is also provided by the present application, including a display panel 100. The display panel 100 includes a data line 11 and a pixel unit 20 connected to the data line 11. Wherein, the data line 11 is configured to output data voltage to the pixel unit 20 during the image display period of each frame. The image display period includes a display period and a vertical blanking stage. In the image display period of at least one frames under the first preset refresh mode, during the display period, the data line 11 is configured to output display voltage to the pixel unit 20, during the vertical blanking stage, the data line 11 is configured to output compensation voltage to the pixel unit 20. And when the display voltage is a positive polarity voltage, a voltage value of the display voltage is less than a voltage value of the compensation voltage, when the display voltage is a negative polarity voltage, the voltage value of the display voltage is greater than the voltage value of the compensation voltage. Thus, compensation to the leakage generated by the display panel 100 in the vertical blanking stage is provided by means of micro charging, improving the display effect of the display panel. When the display panel 100 includes a plurality of refresh modes, the brightness difference in the display images of the display panel 100 under different refresh frequency is reduced to avoid image flickers while switching images.

The display panel and electronic device provided by the present application are described in detail above. In this application, specific examples are applied to explain the principle and implementation mode of the application. The description of the above embodiments is only used to help understand the method and core idea of the application. At the same time, for those skilled in the art, according to the thought of the present disclosure, there will be changes in the specific embodiments and application scope. In conclusion, the content of the specification should not be understood as the limitation of the application.

What is claimed is:

1. A display panel, having a first preset refresh mode and a second preset refresh mode, and comprising:

a data line; and a pixel unit connected to the data line, wherein the data line is configured to output a data voltage to the pixel unit during an image display period of each frame, the image display period comprises a display period and a vertical blanking stage;

a refresh frequency of the second preset refresh mode is higher than a refresh frequency of the first preset refresh mode;

under the first preset refresh mode, the vertical blanking stage comprises a first period and a second period, and a duration of the second period is equal to a duration of the vertical blanking stage under the second preset refresh mode;

under the first preset refresh mode, during the image display period of at least one frames, the data voltage comprises a display voltage and a compensation voltage; during the display period, the data line outputs the display voltage to the pixel unit, during the first period of the vertical blanking stage, the data line outputs the compensation voltage to the pixel unit, and during the second period of the vertical blanking stage, the data line does not output the compensation voltage to the pixel unit;

under the second preset refresh mode, during the vertical blanking stage, the data line does not output the compensation voltage to the pixel unit; and when the display voltage is a positive polarity voltage, a voltage value of the display voltage is less than a voltage value of the compensation voltage, and when the display voltage is a negative polarity voltage, the voltage value of the display voltage is greater than the voltage value of the compensation voltage.

2. The display panel according to claim 1, wherein when the display voltage is a positive polarity voltage, the compensation voltage is a positive polarity voltage corresponding to a maximum display gray scale of the display panel; and when the display voltage is a negative polarity voltage, the compensation voltage is a negative polarity voltage corresponding to the maximum display gray scale of the display panel.

3. The display panel according to claim 1, wherein the voltage value of the compensation voltage is adjusted in real time according to the voltage value of the display voltage.

4. The display panel according to claim 1, wherein a common voltage of the display panel is zero, an absolute value of the display voltage is less than an absolute value of the compensation voltage.

5. The display panel according to claim 1, wherein the display panel comprises a scanning line, the scanning line is configured to cross with the data line;

during the vertical blanking stage, the scanning line is configured to output a reference low level voltage, and a voltage value of the reference low level voltage is greater than or less than a voltage value of a preset reference low level voltage.

6. The display panel according to claim 5, wherein under the first preset refresh mode, during the vertical blanking stage, the scanning line is configured to output a first reference low level voltage, and under the second preset refresh mode, during the vertical blanking stage, the scanning line is configured to output a second reference low level voltage; both a voltage value of the first reference low level voltage and a voltage value of the second reference low level voltage are greater or less than the voltage value of the preset reference low level voltage.

7. The display panel according to claim 6, wherein the voltage value of the first reference low level voltage is equal to the voltage value of the second reference low level voltage.

8. The display panel according to claim 6, when both the voltage value of the first reference low level voltage and the voltage value of the second reference low level voltage are less than the voltage value of the preset reference low level voltage, the voltage value of the first reference low level voltage is less than the voltage value of the second reference low level voltage;

when both the voltage value of the first reference low level voltage and the voltage value of the second reference low level voltage are greater than the voltage value of the preset reference low level voltage, the voltage value of the first reference low level voltage is greater than the voltage value of the second reference low level voltage.

9. An electronic device, comprising the display panel and a driving device, the driving device is configured to provide a data voltage to the display panel, wherein the display panel has a first preset refresh mode and a second preset refresh mode, and comprises:

a data line; and a pixel unit connected to the data line, wherein the data line is configured to output a data voltage to the pixel unit during an image display period of each frame, the image display period comprises a display period and a vertical blanking stage;

a refresh frequency of the second preset refresh mode is higher than a refresh frequency of the first preset refresh mode;

under the first preset refresh mode, the vertical blanking stage comprises a first period and a second period, and a duration of the second period is equal to a duration of the vertical blanking stage under the second preset refresh mode;

under the first preset refresh mode, during the image display period of at least one frames, the data voltage comprises a display voltage and a compensation voltage; during the display period, the data line outputs the display voltage to the pixel unit, during the first period of the vertical blanking stage, the data line outputs the compensation voltage to the pixel unit, and during the second period of the vertical blanking stage, the data line does not output the compensation voltage to the pixel unit;

under the second preset refresh mode, during the vertical blanking stage, the data line does not output the compensation voltage to the pixel unit; and when the display voltage is a positive polarity voltage, a voltage value of the display voltage is less than a voltage value of the compensation voltage, and when the display voltage is a negative polarity voltage, the voltage value of the display voltage is greater than the voltage value of the compensation voltage.

10. The electronic device according to claim 9, wherein when the display voltage is a positive polarity voltage, the compensation voltage is a positive polarity voltage corresponding to a maximum display gray scale of the display panel; and when the display voltage is a negative polarity voltage, the compensation voltage is a negative polarity voltage corresponding to the maximum display gray scale of the display panel.

11. The electronic device according to claim 9, wherein the voltage value of the compensation voltage is adjusted in real time according to the voltage value of the display voltage.

12. The electronic device according to claim 9, wherein a common voltage of the display panel is zero, an absolute value of the display voltage is less than an absolute value of the compensation voltage.

13. The electronic device according to claim 9, wherein the display panel comprises a scanning line, the scanning line is configured to cross with the data line;

during the vertical blanking stage, the scanning line is configured to output a reference low level voltage, and a voltage value of the reference low level voltage is greater than or less than a voltage value of a preset reference low level voltage.

14. The electronic device according to claim 13, wherein under the first preset refresh mode, during the vertical blanking stage, the scanning line is configured to output a first reference low level voltage, and under the second preset refresh mode, during the vertical blanking stage, the scanning line is configured to output a second reference low level voltage; both a voltage value of the first reference low level voltage and a voltage value of the second reference low level voltage are greater or less than the voltage value of the preset reference low level voltage.

15. The electronic device according to claim 14, wherein the voltage value of the first reference low level voltage is equal to the voltage value of the second reference low level voltage.

16. The electronic device according to claim 14, when both the voltage value of the first reference low level voltage and the voltage value of the second reference low level voltage are less than the voltage value of the preset reference low level voltage, the voltage value of the first reference low level voltage is less than the voltage value of the second reference low level voltage;

when both the voltage value of the first reference low level voltage and the voltage value of the second reference low level voltage are greater than the voltage value of the preset reference low level voltage, the voltage value of the first reference low level voltage is greater than the voltage value of the second reference low level voltage.

17. A display panel, having a first preset refresh mode, and comprising:

a data line;

a scanning line crossing with the data line; and a pixel unit connected to the data line and the scanning line, wherein the data line is configured to output a data voltage to the pixel unit during an image display period of each frame, the image display period comprises a display period and a vertical blanking stage;

during the vertical blanking stage, the scanning line is configured to output a reference low level voltage, and a voltage value of the reference low level voltage is greater than or less than a voltage value of a preset reference low level voltage;

under the first preset refresh mode, during the image display period of at least one frames, the data voltage comprises a display voltage and a compensation voltage, during the display period, the data line outputs the display voltage to the pixel unit, and during the vertical blanking stage, the data line outputs the compensation voltage to the pixel unit;

when the display voltage is a positive polarity voltage, a voltage value of the display voltage is less than a voltage value of the compensation voltage, and when the display voltage is a negative polarity voltage, the voltage value of the display voltage is greater than the voltage value of the compensation voltage;

the first preset refresh mode comprises a first refresh mode and a second refresh mode, a refresh frequency of the first refresh mode is lower than a refresh frequency of the second refresh mode;

under the first refresh mode, during the vertical blanking stage, the scanning line is configured to output a first reference low level voltage, under the second refresh mode, during the vertical blanking stage, the scanning line is configured to output a second reference low level voltage; both a voltage value of the first reference low level voltage and a voltage value of the second reference low level voltage are greater or less than the voltage value of the preset reference low level voltage.

18. The display panel according to claim 17, wherein the voltage value of the first reference low level voltage is equal to the voltage value of the second reference low level voltage.

19. The display panel according to claim 17, when both the voltage value of the first reference low level voltage and the voltage value of the second reference low level voltage are less than the voltage value of the preset reference low level voltage, the voltage value of the first reference low level voltage is less than the voltage value of the second reference low level voltage;

when both the voltage value of the first reference low level voltage and the voltage value of the second reference low level voltage are greater than the voltage value of the preset reference low level voltage, the voltage value of the first reference low level voltage is greater than the voltage value of the second reference low level voltage.

20. The display panel according to claim 17, wherein under the first refresh mode, the data voltage comprises a first display voltage and a first compensation voltage, during the display period, the data line outputs the first display voltage to the pixel unit, during the vertical blanking stage, the data line outputs the first compensation voltage to the pixel unit; when the display voltage is a positive polarity voltage, a voltage value of the first display voltage is less than a voltage value of the first compensation voltage, when the first display voltage is a negative polarity voltage, the voltage value of the first display voltage is greater than the voltage value of the first compensation voltage;

wherein under the second refresh mode, the data voltage comprises a second display voltage and a second compensation voltage, during the display period, the data line outputs the second display voltage to the pixel unit, during the vertical blanking stage, the data line outputs the second compensation voltage to the pixel unit; when the display voltage is a positive polarity voltage, a voltage value of the second display voltage is less than a voltage value of the second compensation voltage, when the second display voltage is a negative polarity voltage, the voltage value of the second display voltage is greater than the voltage value of the second compensation voltage; and wherein a voltage difference between the first compensation voltage and the first display voltage is greater a voltage difference between the second compensation voltage and the second display voltage.

* * * * *